United States Patent
Reid

(10) Patent No.: US 9,868,083 B2
(45) Date of Patent: Jan. 16, 2018

(54) FILTER MEDIA CARTRIDGE

(71) Applicant: John Reid, Royal Oak, MI (US)

(72) Inventor: John Reid, Royal Oak, MI (US)

(73) Assignee: Robovent Products Group, Inc., Sterling Heights, MI (US)

( * ) Notice: Subject to any disclaimer, the term of this patent is extended or adjusted under 35 U.S.C. 154(b) by 78 days.

(21) Appl. No.: 14/748,965

(22) Filed: Jun. 24, 2015

(65) Prior Publication Data

US 2015/0367271 A1  Dec. 24, 2015

Related U.S. Application Data

(60) Provisional application No. 62/016,138, filed on Jun. 24, 2014.

(51) Int. Cl.
*B01D 46/52* (2006.01)
*B01D 46/24* (2006.01)
*B01D 46/00* (2006.01)

(52) U.S. Cl.
CPC ....... *B01D 46/523* (2013.01); *B01D 46/0001* (2013.01); *B01D 46/2411* (2013.01); *B01D 46/521* (2013.01); *B01D 2265/06* (2013.01); *Y10T 156/1052* (2015.01)

(58) Field of Classification Search
CPC .......... B01D 46/2411; B01D 46/521; B01D 46/523; B01D 2265/06; B01D 46/0001
See application file for complete search history.

(56) References Cited

U.S. PATENT DOCUMENTS

| 5,252,207 A * | 10/1993 | Miller | B01D 29/012 210/335 |
| 7,128,835 B1 * | 10/2006 | Hundley | B01D 29/21 210/243 |
| 2006/0157403 A1 * | 7/2006 | Harder | B01D 27/005 210/445 |
| 2008/0308488 A1 * | 12/2008 | Iwakata | B01D 27/06 210/455 |
| 2013/0042585 A1 * | 2/2013 | Mei | B01D 46/0001 55/308 |

* cited by examiner

*Primary Examiner* — Robert Clemente

(74) *Attorney, Agent, or Firm* — William H. Honaker; Dickinson Wright PLLC

(57) ABSTRACT

A filter media cartridge and method of making filter media wherein the filter media has a plurality of folds formed into a tube with an internal support core supporting the media material. A plurality of retention bands mounted about the filter media to retain the filter media in position and prevent media from expanding outwardly sufficiently to damage the filter media. At least a one glue bead located circumferentially about the filter media. The glue bead adhering adjacent folds of the media together to provide support and regular spacing of the folds so that the folds are prevented from collapsing with respect to one another.

4 Claims, 7 Drawing Sheets

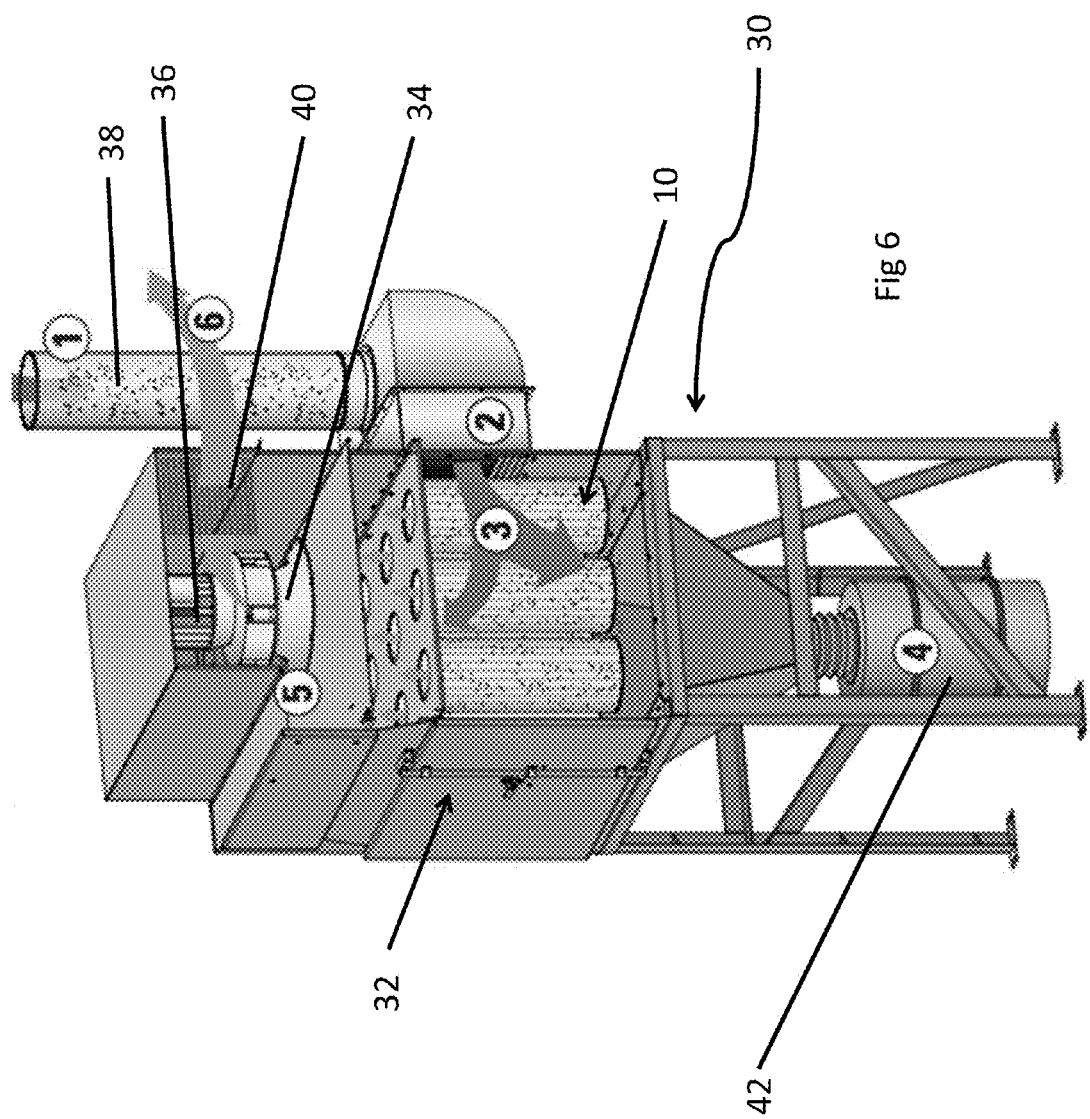

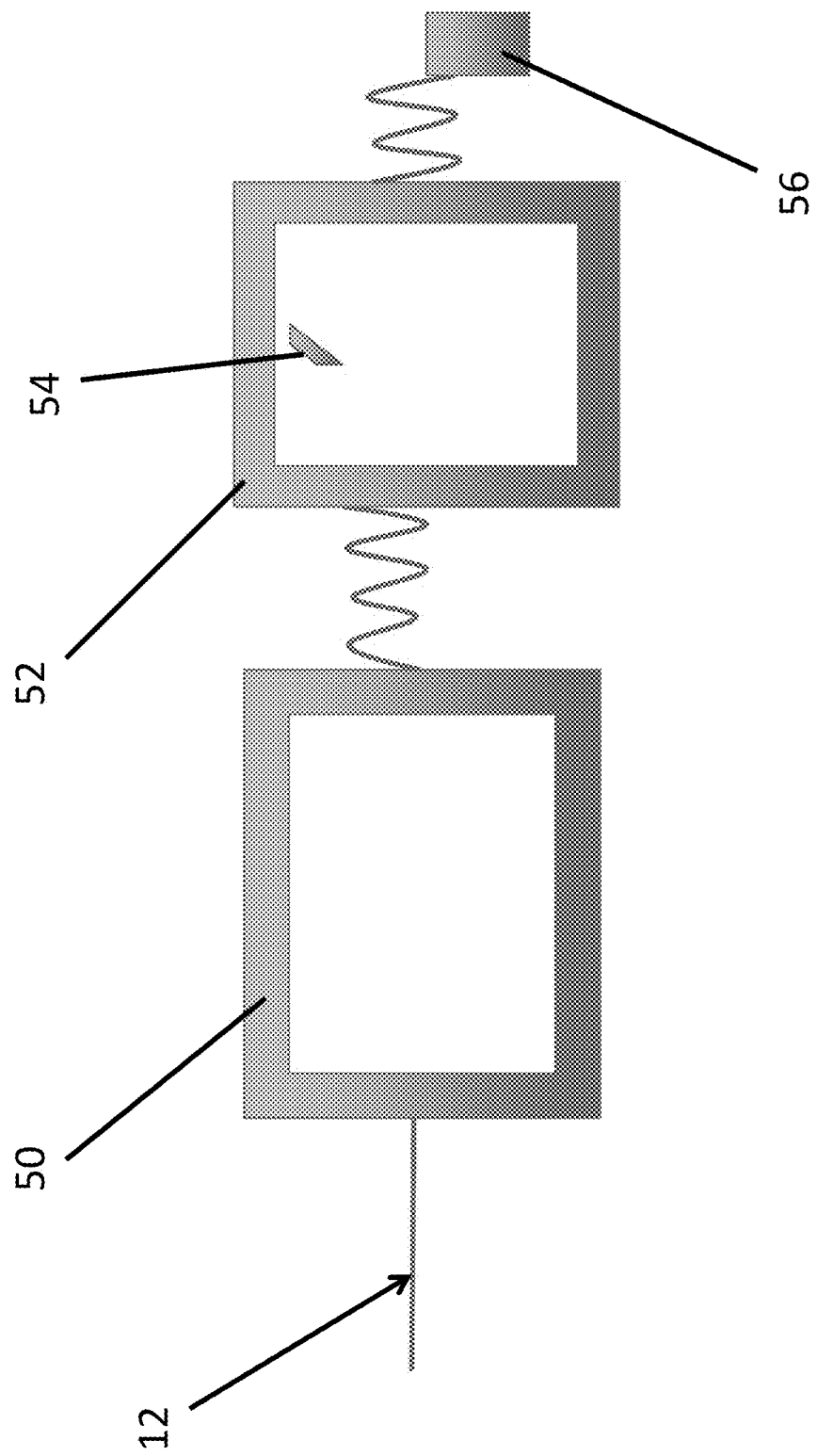

FILTER MEDIA CARTRIDGE

This application claims the benefit of U.S. Provisional Application No. 62/016,138 filed on Jun. 24, 2014.

BACKGROUND

The present invention relates to filter media cartridges used in air filtering systems, particularly industrial air filtering systems.

Air filtering systems are commonly used in numerous industrial applications. Typically, air filter systems draw air from the surrounding environment, pull that air through one or more filters and then expel the filtered air back into the surrounding environment. The filters used can have many shapes, but are typically either flat or tubular. The tubular filters typically draw air through the exterior of the filter into the interior. The filter captures contaminants that are entrained in the air and the filtered air exits the air filter system.

As the filter begins to accumulate contaminants, it is necessary to clean the filter media. One method of cleaning the filter is to pulse compressed air in the interior of the tubular filter media and blow the contaminants off the media. The contaminants are then collected in a pan and discarded.

One disadvantage of known filter media is the inability to withstand the drawing of air through the media to filter the air and the cleaning of the filter by pulsing compressed air through the filter media. The pressures used are high and results in undue flexing of typical filter media. After repeated flexing, the filter media can break down in numerous ways, such as for example folding upon itself, which reduces the filtration area, tearing which results in an inability to filter, etc.

The present invention overcomes these disadvantages by providing a unique filter media cartridge that has reinforced pleats that withstand repeated pressure changes, a central support to withstand repeated pressure changes and support ribs to add additional overall strength to the filter media.

The invention will become more apparent to those skilled in the art from the detailed description of a preferred embodiment. The drawings that accompany the detailed description are described below.

DESCRIPTION OF THE DRAWINGS

FIG. 6 is a perspective view of an example of a air filtration unit incorporating filter media of the present invention.

FIG. 7 is a block diagram illustrating the method of making the filter media of the present invention.

DETAILED DESCRIPTION OF THE INVENTION

Figure 1:
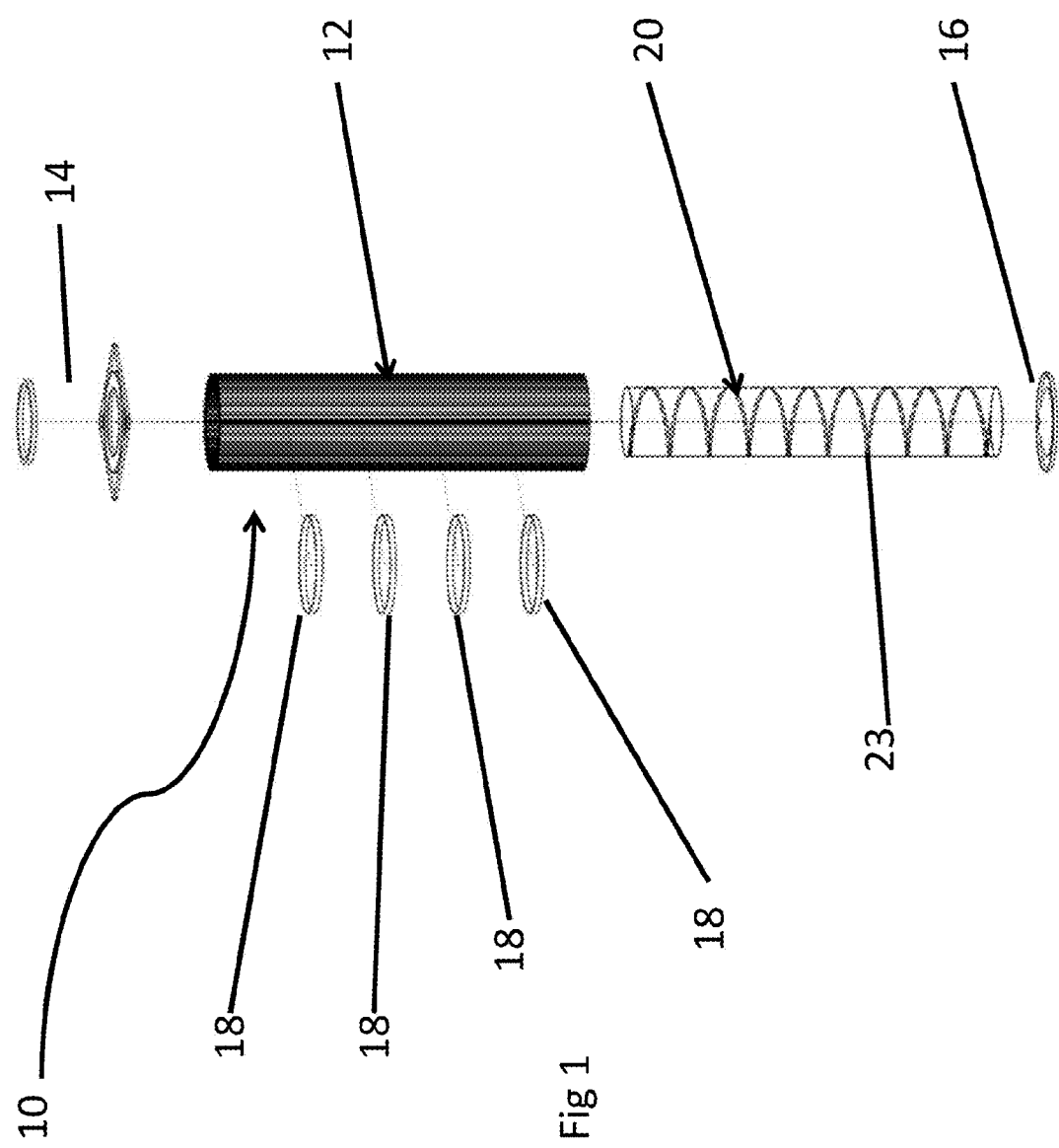
FIG. 1 is an exploded view of the filter media cartridge of the present invention.
Figure 2:
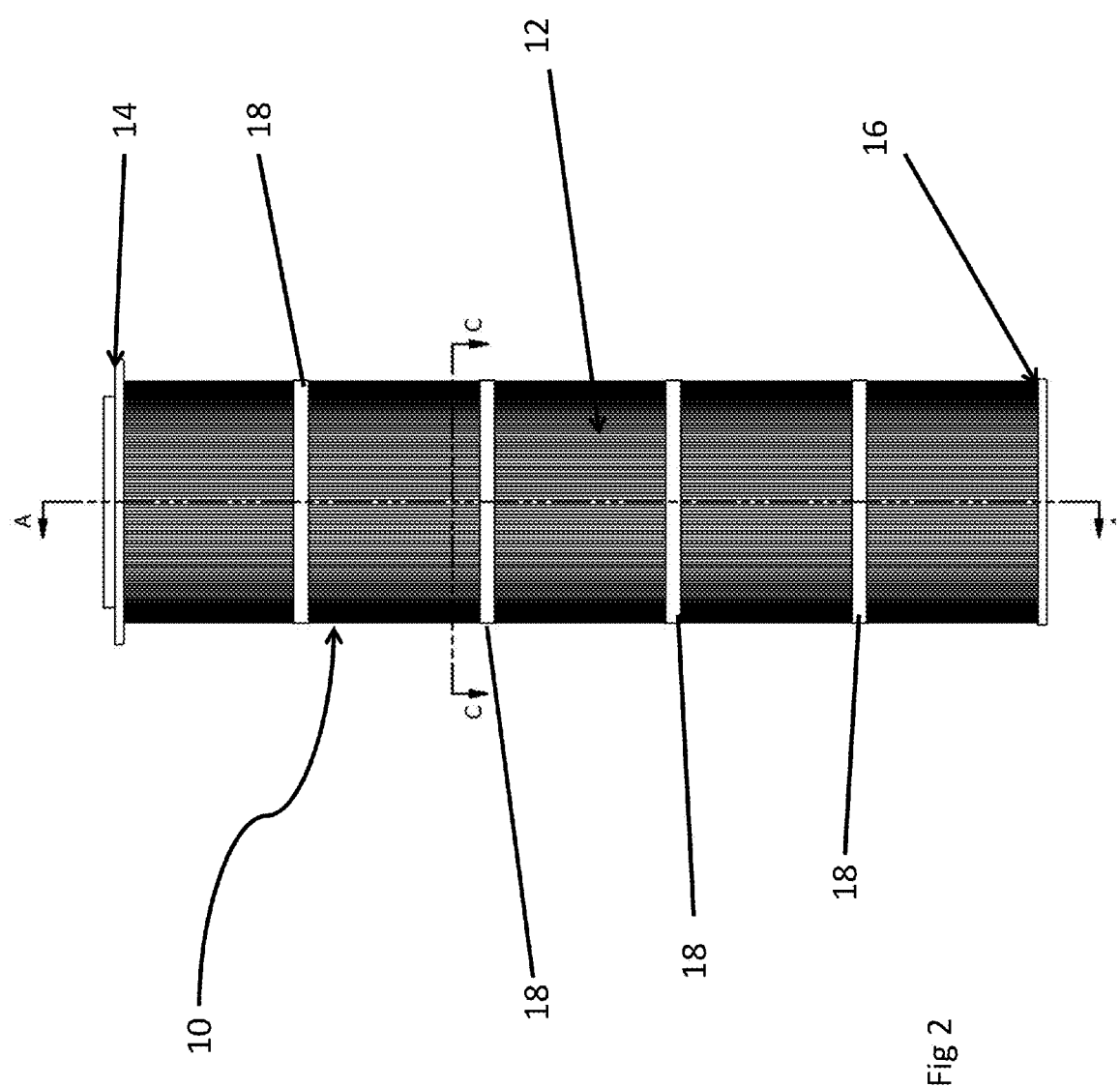
FIG. 2 is a plan view of the filter media cartridge of the present invention.
Figure 3:
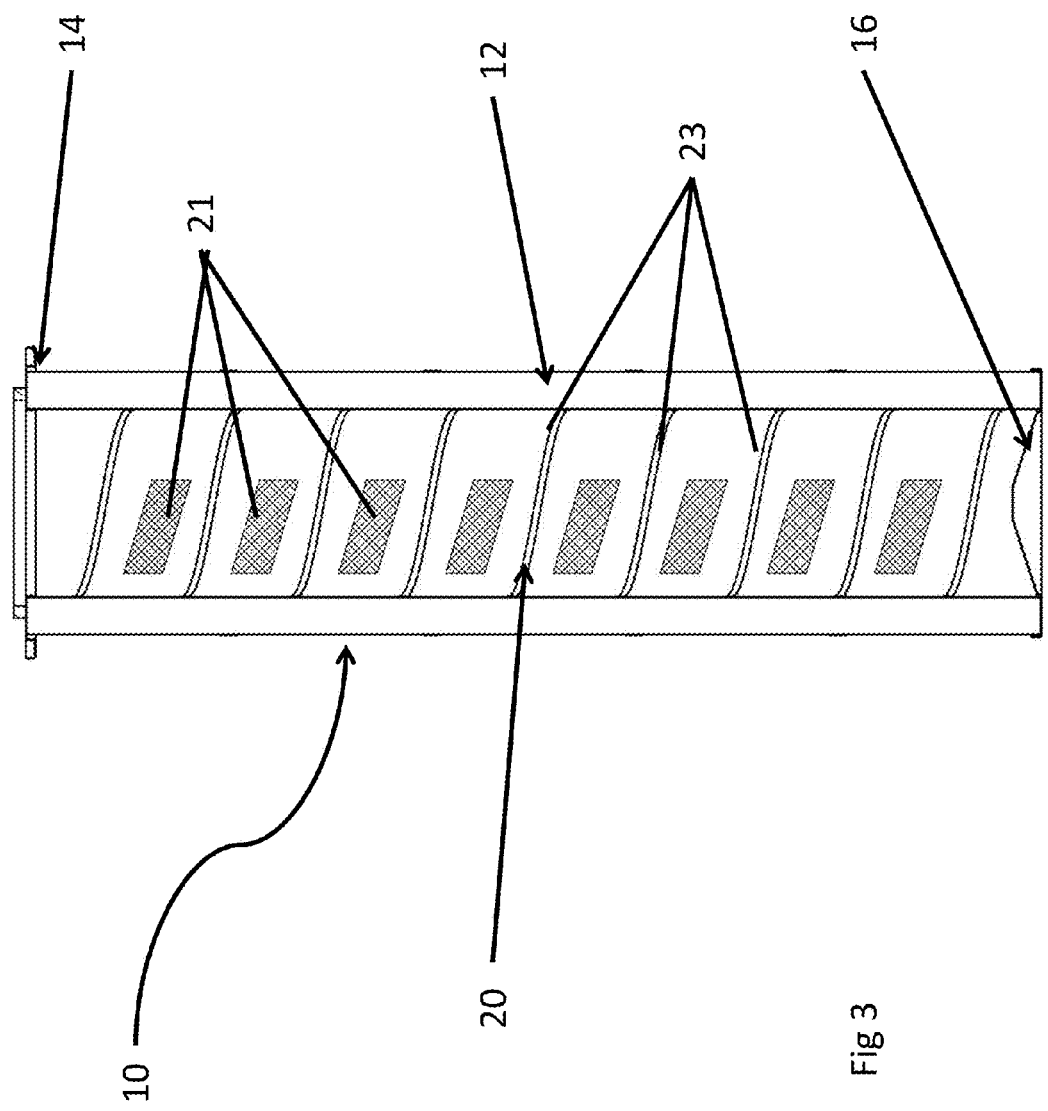
FIG. 3 is a cutaway view of the filter media cartridge of the present invention taken along line A-A of FIG. 1.
Figure 4:
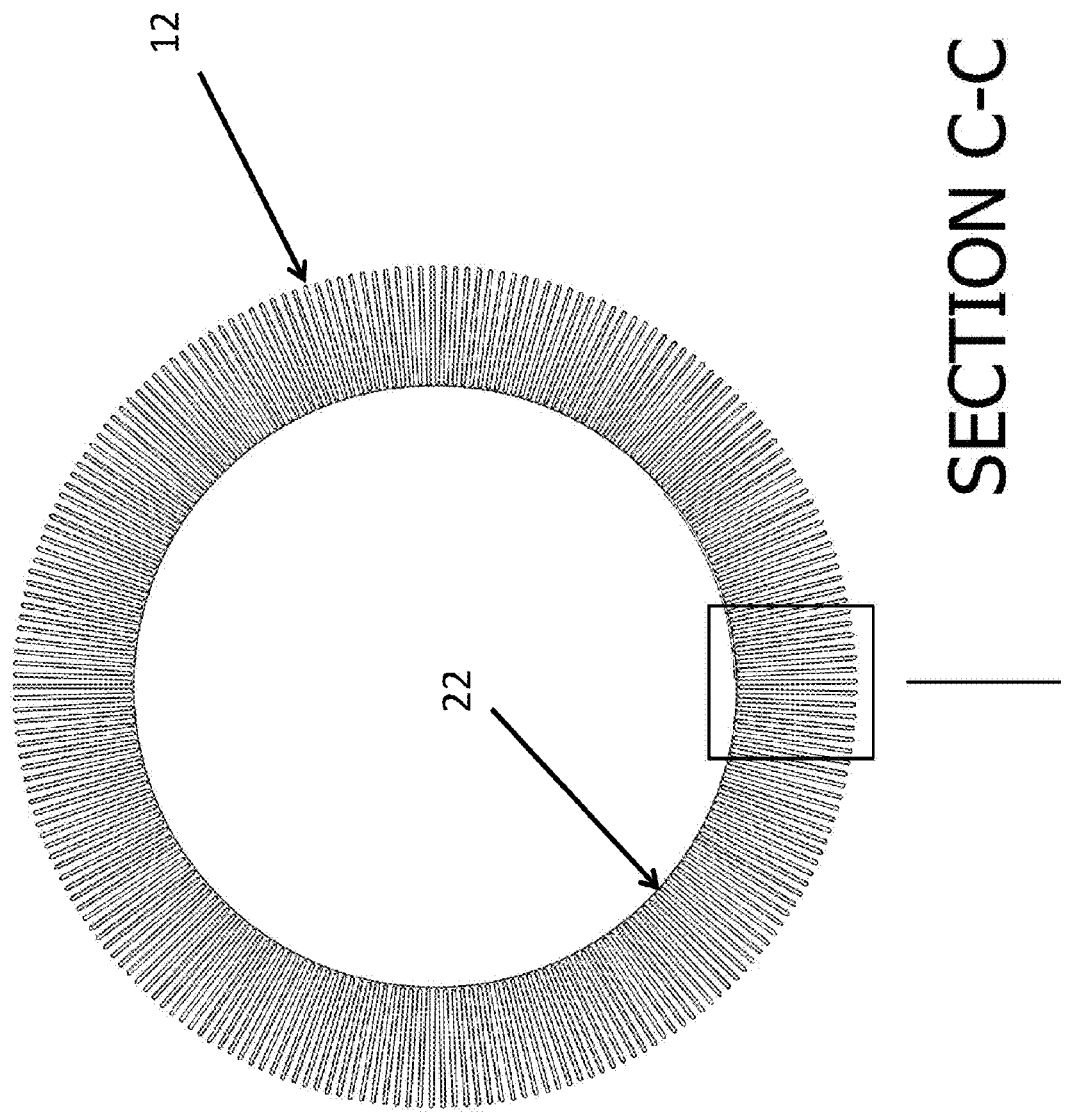
FIG. 4 is a cutaway view of the filter media cartridge of the present invention taken along line C-C of FIG. 1.
Figure 5:
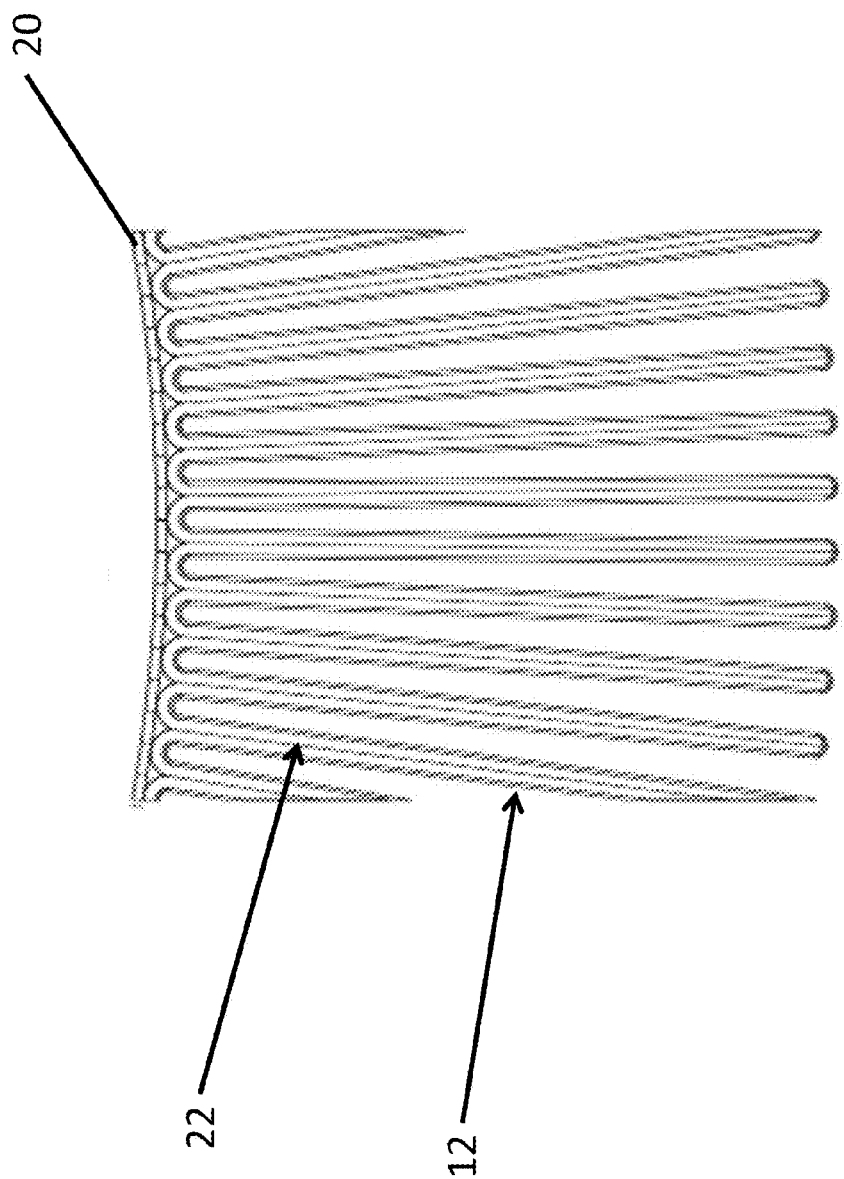
FIG. 5 is an enlarged section of the filter media cartridge of the present invention.

With reference to FIGS. 1 and 2, the filter media cartridge of the present invention is shown generally at 10. The filter cartridge 10 includes a filter media 12 mounted between a top pan 14 and a bottom pan 16. The pans 14 and 16 hold the media in position and facilitate installation of the filter media cartridge 10 within an air filter unit. Retention bands 18 are mounted about the filter media to retain the media 12 in position. This is particularly important when compressed air is pulsed through the media 12 in a reverse direction. Without the restraint of the bands 18, the filter media 12 would be blown outwards away from the internal support core 20 during a compressed air pulse, which can cause damage, ripping or tearing to the media 12, allowing pollutants, particulate or dirt through the filter, compromising its filtration efficiency. In the disclosed embodiment, the bands 18 are mounted to the filter media 12 by adhesive.

To provide additional support, internal support core 20 is provided. The internal support core 20 adds additional support to the filter media cartridge, extending the media's life during operation and cleaning. The internal support core 20 in the disclosed embodiment is expanded metal. As is well known to those of ordinary skill in the art, the expanded metal is formed by making numerous cuts or slits in the metal and then stretching or expanding the metal to form enlarged openings at the various cuts. The expanded metal is shown schematically at 21 in FIG. 2. Ribs 23 are provided along the length of the core 20 and are formed by leaving portions of the expanded metal core 20 free from cuts. The ribs 23 form a continuous spiral support along the length of the internal support core 20.

The filter media 12 of the present invention includes a glue bead 22 that provides spacing between the folds of the media 12 and reinforces the media 12. The glue bead 22 is positioned along the interior of the media 12 adjacent the internal support core 20. In the disclosed embodiment, the glue bead is formed in at least one strip along the internal circumference of the media 12, and in the preferred embodiment, along the top and bottom of the media 12. In the even more preferred embodiment, the glue bead 22 is formed at spaced locations along the length of the media 12. The glue bead 22 is applied in a strip along the media 12 prior to the media being folded. When the media 12 is folded, the glue adheres adjacent folds together along the interior of the media 12.

The glue beads 22 provide substantial support and regular spacing to the folds of the media 12. This prevents the folds and pleats of the media 12 from collapsing against one another when under negative pressure from the airflow being drawn through the media 12. This means the entire surface area of the media 12 is exposed and able to be effectively utilized by the airstream passing through the filter, to evenly distribute the captured contaminants, and to reduce the level of pressure drop and resistance to the airflow created by the media 12 and the captured particulate layer, also known as the dust cake.

With reference to FIG. 7, a block diagram representation of the method of making the filter media of the present invention is illustrated. In the preferred method of making the filter of the present invention, a flat sheet of filter material 12 is fed into a pleating machine 50. The pleating machine creases the filter material to form the folds or pleats. In the disclosed embodiment, the creases are spaced apart at approximately 2 inch intervals along the length of the filter material. The creases create a series of peaks and valleys along the length of the filter material. These pleats or folds are approximately 2 inches deep.

After being creased, the filter material exits the pleating machine and enters the glue bead machine 52. The glue bead machine 52 has a number of spaced glue nozzles 54. In the disclosed embodiment the glue nozzles 54 are approximately on 8 inch centers to apply multiple glue beads along the length of the creased filter material sheet 12. As the sheet enters and progresses through the glue bead machine 52, the filter material 12 begins to unfold allowing the glue to be applied along the peaks and valleys of the sheet. The glue bead is generally applied in a continuous strip along the length of the filter medium 12. Depending upon the filter medium, a plurality of glue strips are spaced along the width of the filter medium and extend along the length of the filter medium.

Upon exiting the glue bead machine 12, the sheet is forced to fold at the creases. A stop bar 56 is used to stop the forward movement of the filter medium 12, which causes the filter medium to fold as it exits the glue bead machine 52. As the filter media 12 folds, adjoining peaks and valleys contact one another with the glue bead strip at the adjoining peaks and valleys adhere to bond the peaks and valleys together at that location. The filter medium is than allowed to cure to form a pleated sheet with peaks and valleys with the adjoining peaks glued together at spaced locations along the width of the filter medium. After curing, the sheet of filter medium is cut to a desired length and formed into a tube. The glue is flexible enough to allow the media to be formed into a tube and have the peaks fan out.

In the disclosed embodiment, glue, in this application a two part curing adhesive is applied to the ends of the tube 12 and to the end caps 14 and 16. The end caps 14 and 16 can then be secured to the ends of the tube 12. Additionally, the core 20 is adhered to the ends caps 14 and 16 by the same adhesive.

As will be appreciated by those of ordinary skill in the art, either the top pan 14 or bottom pan 16 or both have open centers to allow the filtered air to flow through the cartridge 10. In the disclosed embodiment, the top and bottom pans 14 and 16 and the core 20 are attached to the media 12 by the two part adhesive.

With reference to FIG. 6, an example of an air filtration unit is generally illustrated at 30. The air filtration unit has a housing 32. The filter media cartridges 10 of the present invention are mounted in the housing 32. A fan 34 and motor 36 draw air through an intake 38. The air that is drawn in is pulled through the filter media cartridges 10. The air has entrained particulates that are trapped in the filter media cartridge 10. The air that is pulled through the media 12 then is expelled to through the outlet 40.

Valves and nozzles can be used to pulse compressed air in reverse through the filter media cartridges 10 to blow off the particulates that have been trapped in the filter media 12. The particulate that is blown off the media 12 is deposited in the container 42. The container 42 can then be emptied.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. A filter media cartridge for filtering air comprising:
   a filter media material for filtering air having a plurality of folds and formed into a tube with opposite ends;
   an internal support core supporting said media material, said internal support core is a tube of expanded metal, said internal support core includes support ribs, said ribs extend in a spiral pattern along the length of the support core, said support ribs being defined by portions of said expanded metal being free from cuts;
   a plurality of separate retention bands longitudinally mounted in spaced relationship to one another about the filter media to retain the filter media in position and prevent said media from expanding outwardly sufficiently to damage the filter media said retention bands exposing a majority of the surface area of said filter media;
   at least a first glue bead located circumferentially about said filter media, said glue bead adhering adjacent folds of said media, providing support and regular spacing of said folds;
   whereby said folds are prevented from collapsing with respect to one another.

2. The filter media cartridge of claim 1, further including at least a second glue bead located circumferentially about said filter media, said first and second glue beads being spaced longitudinally apart along the length of said filter media cartridge.

3. The filter media cartridge of claim 1, further including a plurality of glue beads located circumferentially about said filter media, said plurality of glue beads being spaced longitudinally apart along the length of said filter media cartridge.

4. The filter media cartridge of claim 1, further including end caps positioned at the opposite ends of said filter media.

* * * * *